Patented July 14, 1931

1,814,149

UNITED STATES PATENT OFFICE

PHILIP H. GROGGINS, OF WASHINGTON, DISTRICT OF COLUMBIA; DEDICATED, BY ASSIGNMENT, TO THE GOVERNMENT AND THE PEOPLE OF THE UNITED STATES OF AMERICA

PROCESS FOR THE PREPARATION OF 2-AMINO-BETA-PHENYL-ANTHRAQUINONE BY RING CLOSURE

No Drawing.    Application filed August 8, 1929.   Serial No. 384,517.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by and for the Government for governmental purposes without payment to me of any royalty thereon.

My invention relates to 2-amino-beta-phenyl-anthraquinone and a process for making the same.

It is the object of my invention to provide a simple and economically practicable method for making 2-amino-beta-phenyl-anthraquinone which is a new and valuable intermediate for the preparation of dyestuffs. Other and further aspects of this invention will be apparent from the disclosures in the specification and appended claims.

I have discovered that 2-amino-para-phenyl-ortho-benzoyl-benzoic acid and its salts, which have been described in my co-pending application Serial No. 384,511 filed August 8, 1929, under certain conditions lose one molecule of water and close the ring to form 2-amino-beta-phenyl-anthraquinone. This reaction is probably best expressed by the following equation:

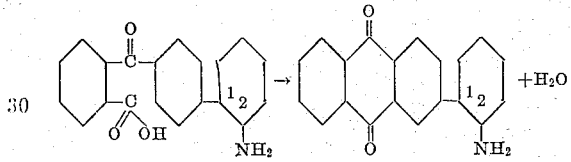

I have discovered that the elimination of water from 2-amino-para-phenyl-ortho-benzoyl-benzoic acid may be brought about by treating with suitable dehydrating agents such as sulfuric acid, nitrobenzene-sulfonic acid, or sulfuryl chloride. I find it advisable to carry out the dehydrating process in the presence of an inert solvent such as nitrobenzene, kerosene, or nitrotoluene. I prefer to use nitrobenzene as the inert solvent, because it is cheap and is an excellent solvent for the keto acid as well as the resultant 2-amino-beta-phenyl-anthraquinone.

Without limiting my invention to any particular procedure the following examples will serve to illustrate my invention in the preferred form.

*Example 1.*—One hundred parts of 2-amino-para-phenyl-ortho-benzoyl-benzoic acid are treated with 400 parts of 95 per cent sulfuric acid in the presence of 150 parts of nitrobenzene. The mixture is heated for three hours at 125° C. after which the batch is cooled and diluted. The nitrobenzene is removed by distillation with steam and the 2-amino-beta-phenyl-anthraquinone obtained as a dark brown product. When purified by recrystallizing from chlorobenzene, it is obtained as brown needles. It melts at 200–201° C. and gives all the typical reactions of anthraquinone derivatives of this type.

*Example 2.*—One hundred parts of 2-amino-para-phenyl-ortho-benzoyl-benzoic acid are treated with 200 parts of sulfuryl chloride and one hundred parts of nitrobenzene. The charge is refluxed for a period of two hours. After cooling, water and dilute alkali are added and the nitrobenzene distilled with steam. The 2-amino-beta-phenyl-anthraquinone is obtained as a brown crystalline product. It is washed with hot water and then dried.

I am aware that many changes may be made and numerous details of the process be varied through a wide range without departing from the principles of this invention, and I therefore do not purpose limiting the patent granted hereon, otherwise than is necessitated by the prior art.

I claim as my invention—

1. The process of preparing 2-amino-beta-phenyl-anthraquinone which comprises heating 2-amino-para-phenyl-ortho-benzoyl-benzoic acid at a temperature of about 125° C. with 95 per cent. sulfuric acid as a dehydrating agent in the presence of nitrobenzene.

2. The process of preparing 2-amino-beta-phenyl-anthraquinone which comprises heating 2-amino-para-phenyl-ortho-benzoyl-benzoic acid with a mixture of 95 per cent. sulfuric acid and boric acid as a dehydrating agent at a temperature of about 125° C. in the presence of an inert organic, aromatic solvent.

3. The process of preparing 2-amino-beta-phenyl-anthraquinone which comprises heating 2-amino-para-phenyl-ortho-benzoyl-benzoic acid with sulfuric acid monohydrate and boric acid in the presence of nitrobenzene at a temperature of about 125° C. for a period of approximately three hours and removing the nitrobenzene by steam to precipitate out the 2-amino-beta-phenyl-anthraquinone.

In testimony whereof, I have hereunto subscribed my name.

PHILIP H. GROGGINS.